(12) United States Patent
Kim et al.

(10) Patent No.: US 8,864,073 B1
(45) Date of Patent: Oct. 21, 2014

(54) AEROSHELL THERMAL PROTECTION SYSTEM AND METHOD

(75) Inventors: Dae H. Kim, Laguna Niguel, CA (US); Caroline Neri Kim, legal representative, Laguna Niguel, CA (US); Ben Y. Won, Huntington Beach, CA (US); Peter A. Hogenson, Long Beach, CA (US); Vann Heng, Buena Park, CA (US); Mary M. Litwinski, Dana Point, CA (US); Robert J. Perez, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 542 days.

(21) Appl. No.: 13/192,431

(22) Filed: Jul. 27, 2011

(51) Int. Cl.
   *B64C 1/38* (2006.01)
   *B64G 1/58* (2006.01)

(52) U.S. Cl.
   USPC ........................................ 244/121; 244/171.7

(58) Field of Classification Search
   USPC ........ 244/1 N, 120, 121, 158.7, 158.9, 158.1, 244/159.3, 171.7, 171.8
   See application file for complete search history.

(56) References Cited

U.S. PATENT DOCUMENTS

| | | | |
|---|---|---|---|
| 5,429,851 A * | 7/1995 | Sallee | 428/71 |
| 5,445,861 A * | 8/1995 | Newton et al. | 428/116 |
| 7,485,354 B2 * | 2/2009 | Bohner et al. | 428/60 |
| 7,887,937 B2 | 2/2011 | Heng et al. | |
| 2004/0033881 A1 | 2/2004 | Heng | |
| 2004/0091699 A1 | 5/2004 | Denham | |
| 2008/0017013 A1 | 1/2008 | Heng | |
| 2011/0003077 A1 | 1/2011 | Heng | |

OTHER PUBLICATIONS

Fiberform, "Carbon & Graphite Felt," retrieved May 29, 2011.
Fiberform, "Insulation," retrieved May 29, 2011.

* cited by examiner

*Primary Examiner* — Brian M O'Hara

(57) ABSTRACT

A thermal protection system for a vehicle may include a substantially rigid, relatively thin outer aeroshell, a relatively low density insulation layer, and a resiliently compressible conformal layer. The vehicle may include a substructure. The aeroshell may be configured to be fastened to the substructure. The insulation layer may be disposed against the aeroshell. The conformal layer may be disposable against the insulation layer. The conformal layer may be compressively preloaded against the substructure when the aeroshell is fastened to the substructure.

20 Claims, 13 Drawing Sheets

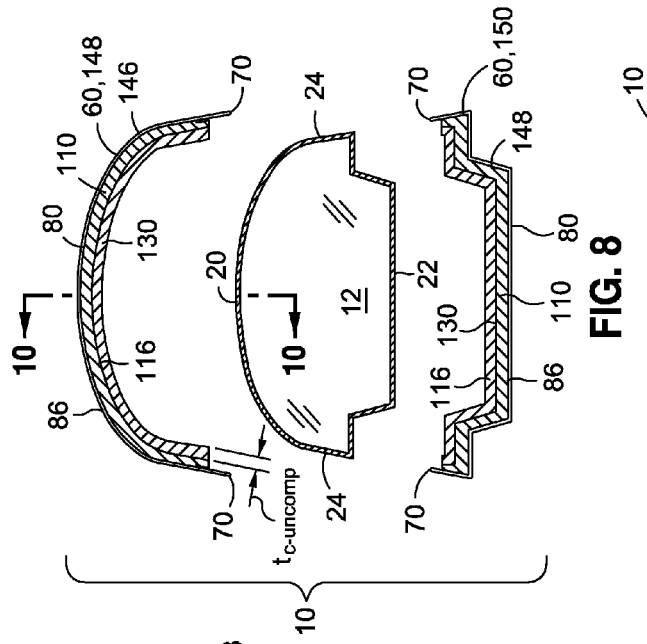
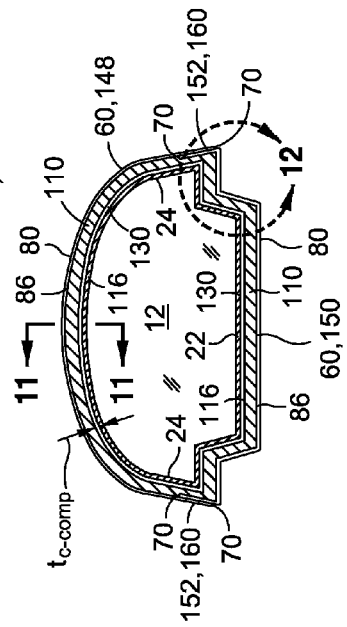
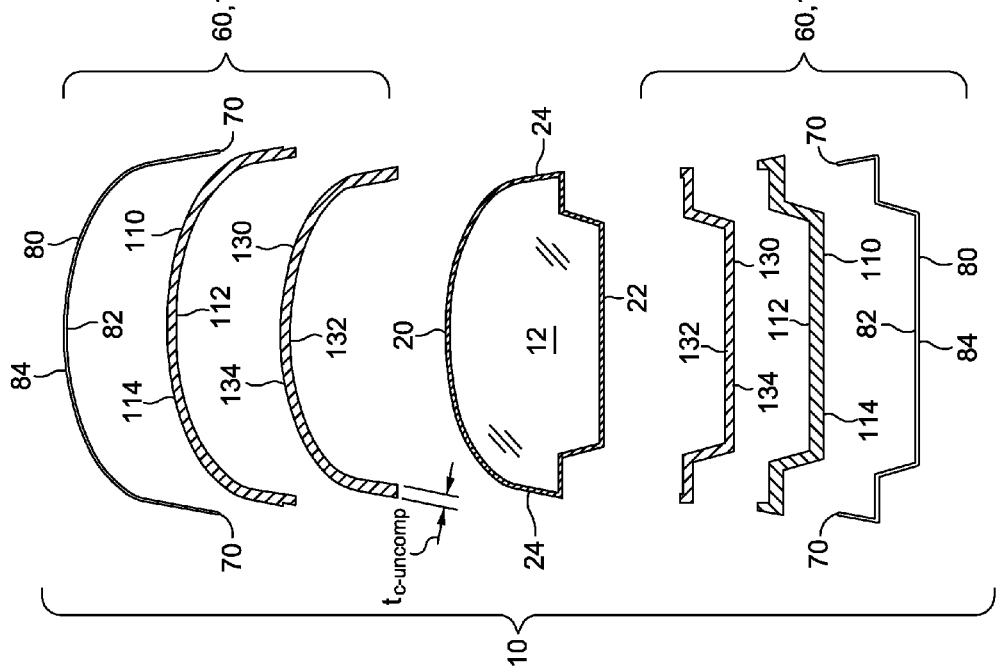

AEROSHELL THERMAL PROTECTION SYSTEM AND METHOD

FIELD

The present disclosure relates generally to thermal protection systems and, more particularly, to a thermal protection system for attachment to a vehicle in a manner facilitating movement of an insulation layer relative to a substructure and which is optimized for subsystem access.

BACKGROUND

Thermal protection systems are employed in a wide variety of applications including, but not limited to, reusable launch vehicles and hypersonic vehicles. Such thermal protection systems are typically configured to provide a thermal shield for the vehicle substructure and the internal systems (e.g., fuel system, control system) and subsystems. For example, a thermal protection system (TPS) may be applied to a hypersonic vehicle to provide a thermal shield against extreme surface temperatures of the TPS. The extreme surface temperatures may result from aerodynamic heating due to hot convective flow passing over the exterior surfaces as the vehicle travels through the atmosphere at speeds of up to Mach 5 and beyond. The TPS must be capable of maintaining the vehicle substructure at temperatures below the temperature at which material properties of the substructure begin to degrade. In addition, the TPS must be capable of maintaining the internal systems at temperatures below their operational limits.

In addition to protecting the substructure and internal systems against excessive temperatures, a TPS must also accommodate movement of the TPS relative to the substructure. Such relative movement may result from mechanical loads that may be imposed on the vehicle and/or thermal stresses that may be imposed on the vehicle. Mechanical loading of the vehicle may occur due to aerodynamic forces acting on the vehicle during flight. Such aerodynamic forces may cause flexing of the vehicle and movement of the TPS relative to the substructure. Mechanical loading may also occur during launch of the vehicle or due to ground handling of the vehicle and which may also result in movement of the TPS relative to the substructure.

In addition to accommodating mechanical loads, the TPS must be capable of accommodating thermal stresses caused by differences in thermal growth of the TPS relative to the thermal growth of the underlying substructure. Such differential thermal growth may result from differences in the coefficient of thermal expansion (CTE) of the different TPS materials relative to one another and differences in the CTE of the TPS relative to the CTE of the substructure materials. Differential thermal growth may also occur as a result of differences in the temperature of the TPS and the relatively cooler temperature of the underlying substructure. Differential thermal growth may additionally occur as a result of dissimilar heating on different parts of the vehicle concurrently.

On a reusable launch vehicle such as the Space Shuttle, the TPS may comprise a plurality of individual tiles that may be attached to the substructure. One technique for accommodating relative movement of the substructure and TPS is to include gaps between the tiles. However, in order to restrict leakage of hot convective airflow into the gaps and to minimize aerodynamic pressure losses of the airflow passing over the gaps, it is necessary to minimize gap dimensions or fully seal the gaps. Minimizing gap dimensions between tiles may require forming the tiles with relatively tight dimensional tolerances. Unfortunately, for a relatively large quantity of tiles applied to a vehicle (e.g., tens of thousands on a single Space Shuttle), forming tiles with relatively small dimensional tolerances and sealing the tile gaps may significantly add to the cost and complexity of the TPS. Furthermore, in order to maintain aerodynamic smoothness of a vehicle with multiple-tile TPS, it is necessary to minimize surface steps at the gaps between the tiles to minimize the potential for localized heating and early transition from laminar to turbulent flow. The requirement to minimize surface steps further adds to the cost and complexity of the TPS.

A further drawback associated with individual tiles is that such tiles are typically adhesively bonded to the substructure. For a reusable launch vehicle, it is typically necessary to perform inspection, maintenance, and refurbishment operations on the vehicle between flights. In order to gain access to the substructure and the internal systems of the vehicle, it may be necessary to remove the tiles. Due to the adhesive bonding of the tiles to the substructure, removal of the tiles may be a time-consuming and labor intensive process and may result in damaging or destroying the removed tiles.

Furthermore, the installation of new tiles may require removal of the old adhesive and preparation of the surface of the substructure for new tiles. New tiles with appropriate geometry may then be fabricated, fit-checked to the vehicle, and adhesively bonded to the substructure. The process of bonding new tiles to the substructure may require the use of a vacuum bag to force the tiles against the substructure under pressure. The vacuum bag may be held under vacuum until the adhesive cures after which the vacuum bag may be removed. Seals may then be installed within the tile gaps followed by inspection of the replaced tiles and seals. As may be appreciated, the total process of removing and replacing tiles may be rather lengthy and may entail a significant amount of touch labor and vehicle down time.

As can be seen, there exists a need in the art for a TPS for a vehicle that may be easily removed from the vehicle to allow access to the substructure and internal systems in a manner that minimizes vehicle down time and avoids damage to the TPS. In addition, there exists a need in the art for a TPS that can accommodate movement of the TPS relative to the substructure due to mechanical loading of the vehicle and due to differential thermal growth of the TPS relative to the substructure.

SUMMARY

The above-noted needs associated with thermal protection systems are specifically addressed and alleviated by the various embodiments disclosed herein. More specifically, a thermal protection system (TPS) for a vehicle is provided. The vehicle may include a substructure. The TPS may include a substantially rigid, relatively thin, ceramic matrix composite aeroshell configured to be fastened to the substructure. The TPS may further include a relatively low density and substantially rigid insulation layer that may be disposed against the aeroshell. The TPS may additionally include a resiliently compressible conformal layer that may be disposable against the insulation layer and may be compressively preloaded against the substructure when the aeroshell is fastened to the substructure.

In a further embodiment, disclosed is a vehicle which may comprise a substructure and a TPS. The TPS may include a substantially rigid ceramic matrix composite aeroshell configured to be fastened to the substructure. The TPS may include a relatively low density, substantially rigid insulation layer disposed against the aeroshell. The TPS may further include a resiliently compressible conformal layer that may be disposable against the insulation layer and may be compressively preloaded against the substructure when the aeroshell is fastened to the substructure.

Also disclosed is a method of insulating a vehicle having a substructure. The method may include providing a substantially rigid aeroshell. The method may further include disposing a relatively low density and substantially rigid insulation layer against the aeroshell. The method may also include disposing a resiliently compressible conformal layer against the insulation layer. The aeroshell may be attached to the substructure. The conformal layer may be compressively preloaded between the insulation layer and the substructure in response to attaching the aeroshell to the substructure.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 7 is an exploded sectional view of the hypersonic vehicle and the TPS and illustrating the upper and lower portions each having an aeroshell, an insulation layer, and a conformal layer;

FIG. 8 is a partially exploded sectional view of the hypersonic vehicle illustrating the aeroshell, insulation layer, and conformal layer assembled together;

FIG. 9 is a sectional view of the hypersonic vehicle taken along line 9 of FIG. 6 and illustrating the shell assemblies of the upper and lower portions of the TPS installed on the vehicle substructure;

DETAILED DESCRIPTION

Figure 1:
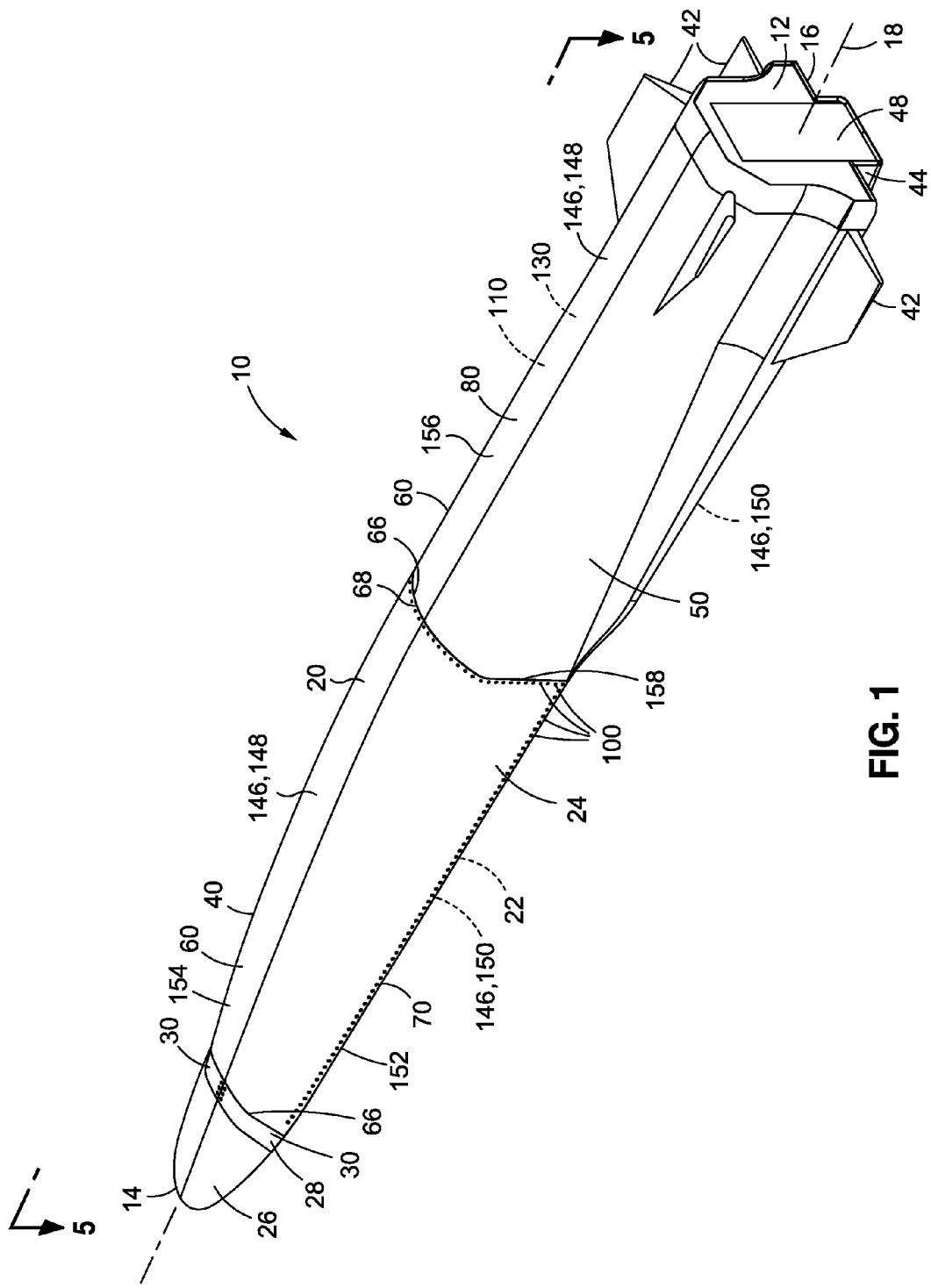
FIG. 1 is a top perspective illustration of a hypersonic vehicle having an embodiment of a thermal protection system (TPS) attached thereto.
Figure 2:
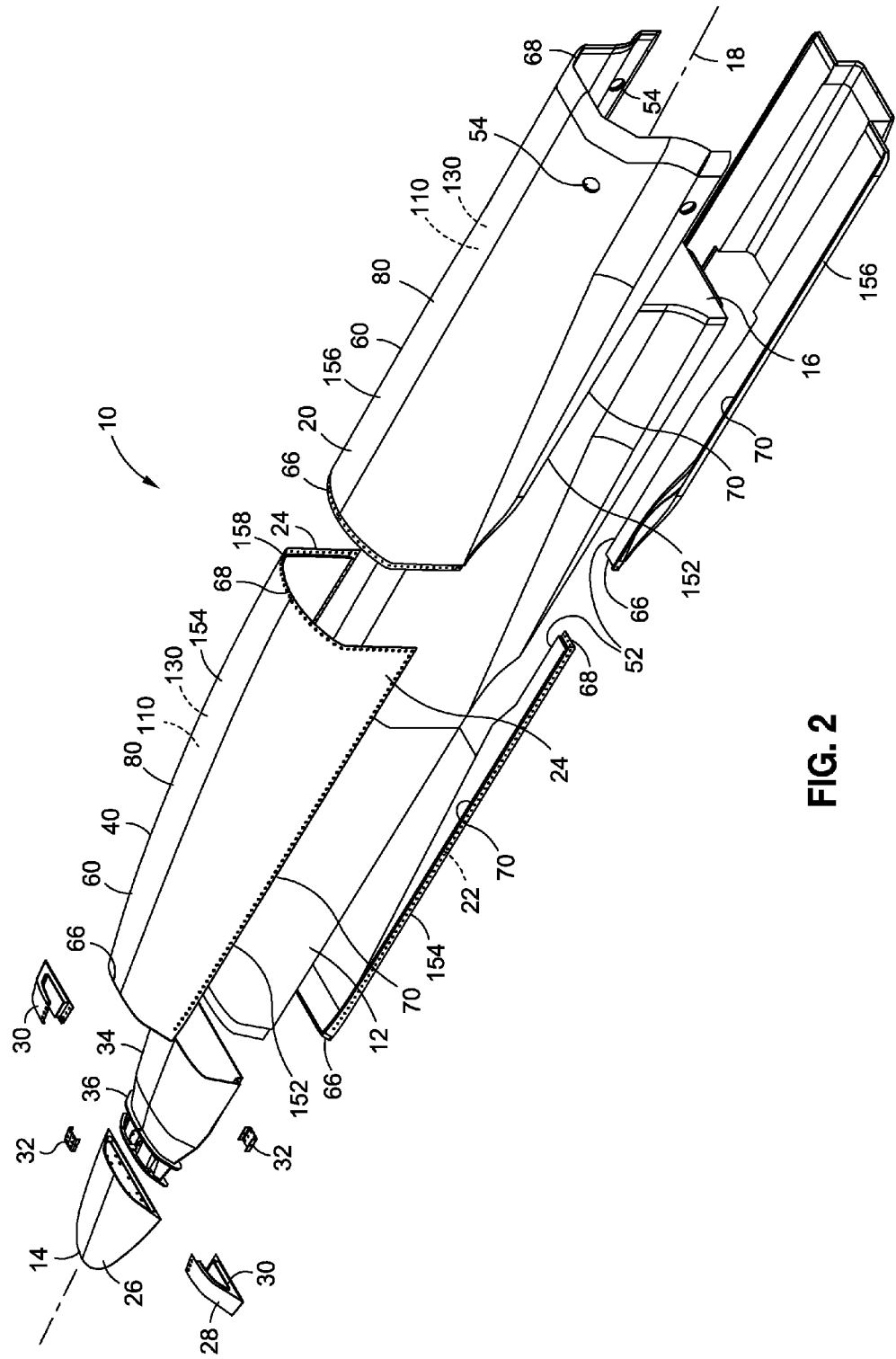
FIG. 2 is a top perspective exploded illustration of the hypersonic vehicle illustrating the interconnectivity of upper and lower portions of the TPS to the substructure of the vehicle.

Referring now to the drawings wherein the showings are for purposes of illustrating various embodiments of the disclosure, shown in FIGS. 1 and 2 is a vehicle 10 configured as a hypersonic vehicle and having an embodiment of a thermal protection system 50 (TPS) installed on the vehicle 10. The vehicle 10 has a forward end 14 and an aft end 16 with a longitudinal axis 18 extending therebetween. The vehicle 10 may include a crown 20 on an upper portion 148 of the vehicle 10, a belly 22 on a lower portion 150 of the vehicle 10, and an opposing pairs of sides 24. The vehicle 10 may further include a propulsion system 44 which may include an air inlet 46 (FIG. 6) and an exhaust nozzle 48 (FIG. 1). The vehicle 10 may further include one or more control surfaces 42 mounted on the vehicle 10 for directional control.

Although the TPS 50 embodiments disclosed herein are described in the context of a hypersonic vehicle, the TPS 50 embodiments, in whole or in part, may be applied to or implemented in other types of vehicles and are not limited to a hypersonic vehicle 10. For example, the TPS 50 may be applied to a re-entry vehicle, a crew exploration vehicle (CEV), or any one of a variety of other vehicles that require thermal shielding for protecting a substructure of a vehicle or for protecting the vehicle's internal or external systems. In an embodiment, the TPS 50 may be applied to vehicles having advanced air breathing stages as well as supersonic air launch platforms combining air breathing and rocket stages for transatmospheric and/or orbital missions. However, the TPS 50 may be applied to any air vehicle, space vehicle, or land vehicle, without limitation, and may further include application to immovable or stationary objects such as building structures or fixed apparatus such as machinery.

Figure 3:
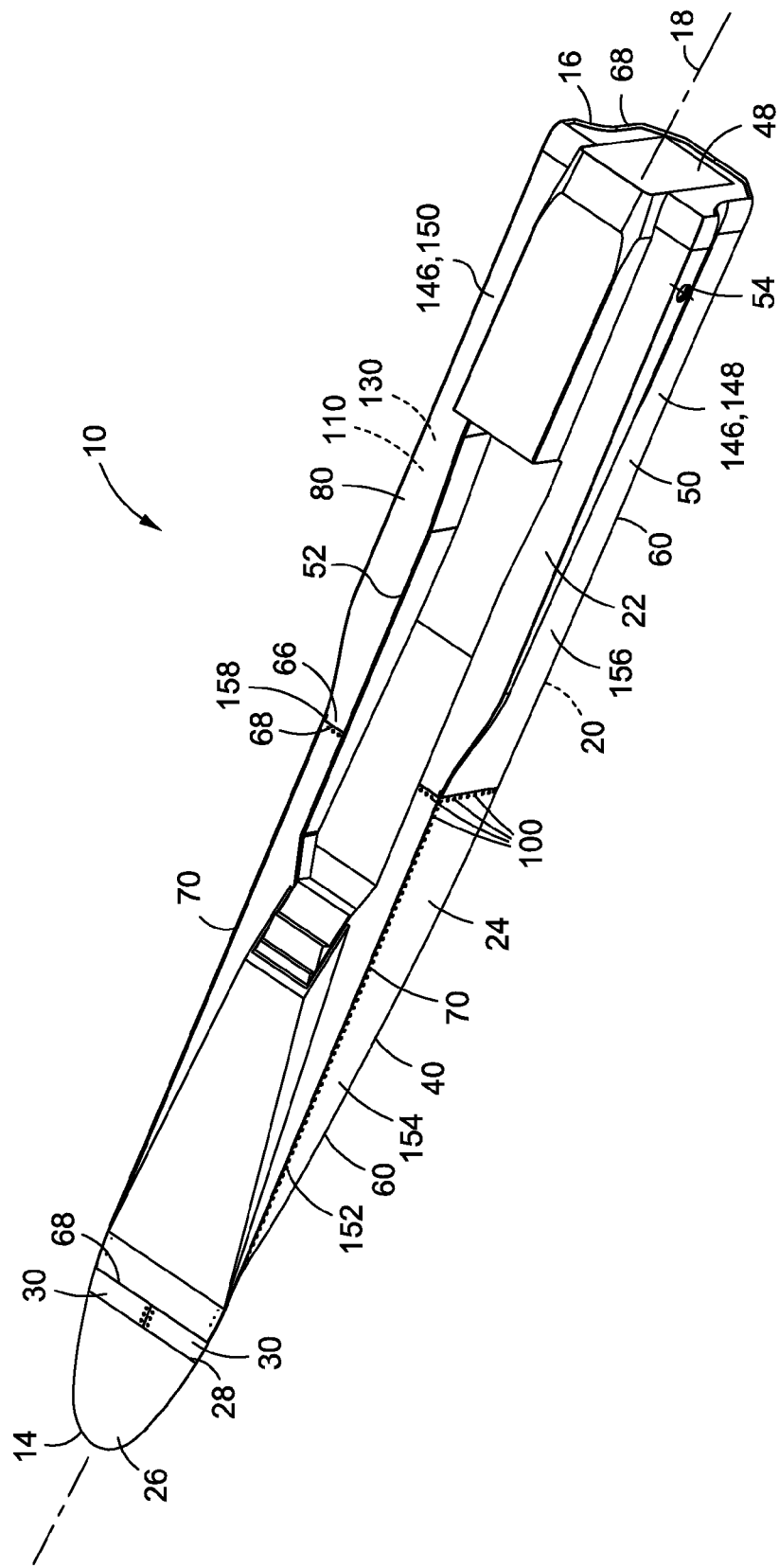
FIG. 3 is a bottom perspective illustration of the hypersonic vehicle.
Figure 4:
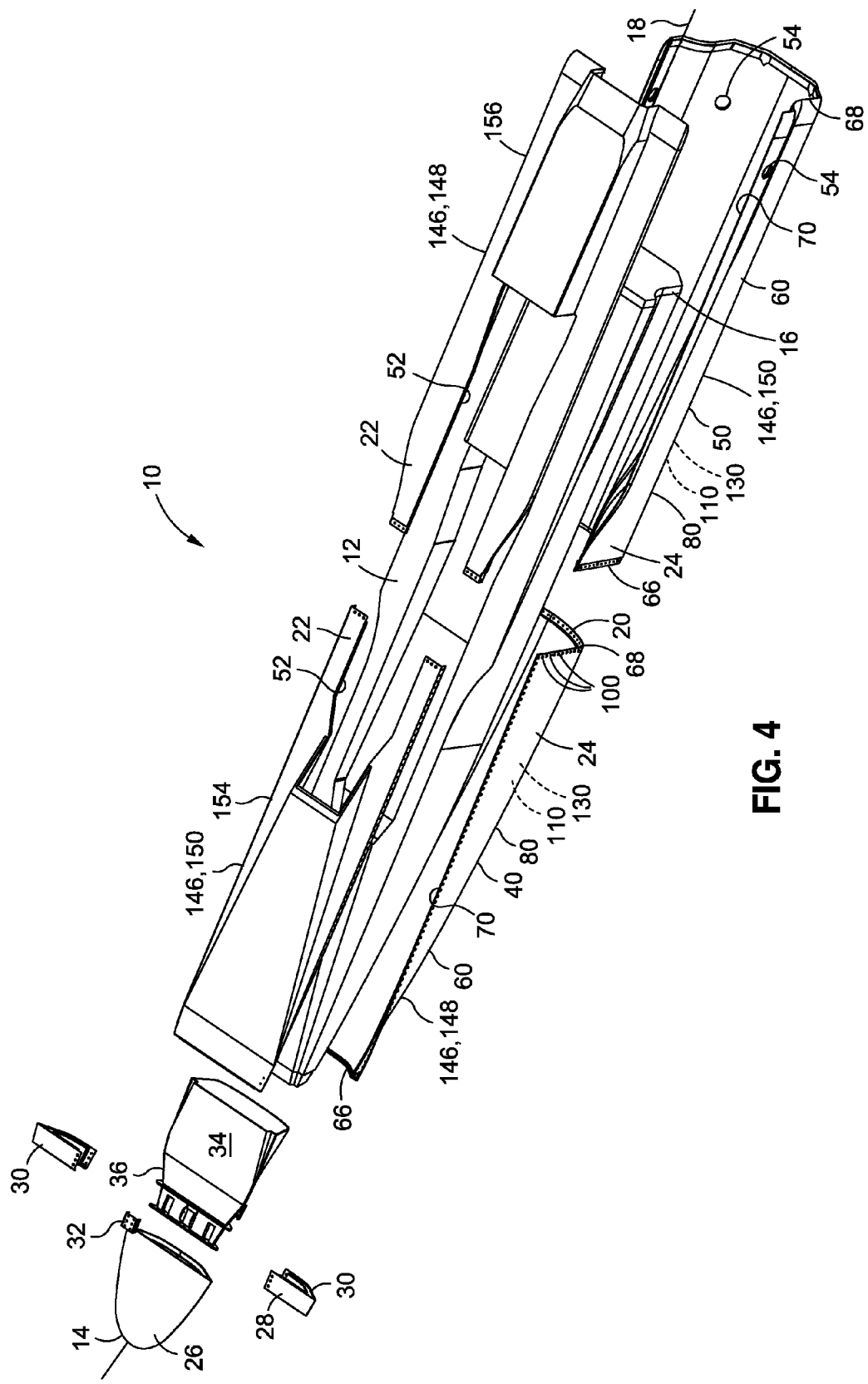
FIG. 4 is a bottom perspective exploded illustration of the hypersonic vehicle.

Referring to FIGS. 3-4, shown are bottom views of the vehicle 10 and the TPS 50 attached thereto. The vehicle 10 may include a nose piece 26 at a forward end 14 of the vehicle 10 and which may be formed of tungsten or other suitable high-temperature material. The vehicle 10 may further include a substructure 12 (FIG. 4) having a thermal isolator 34 (FIG. 4) located at a forward end 14 of the vehicle 10. The substructure 12 may be formed of high temperature material such as inconel, titanium, or other suitable high-temperature materials. The nose piece 26 may be mounted to the thermal isolator 34. The thermal isolator 34 may provide thermal separation or shielding of the substructure 12 from the nose piece 26. The substructure 12 may comprise a generally hollow body into which the internal systems (not shown) of the vehicle 10 may be installed.

The TPS 50 may be divided into one or more mating portions 146. For example, FIGS. 1-4 illustrate the TPS 50 divided into an upper portion 148 and a lower portion 150.

Furthermore, the upper portion 148 and the lower portion 150 may each be divided at a location along the longitudinal axis 18 into one or more sections. For example, FIG. 2 illustrates the upper and lower portion 148, 150 of the TPS 50 divided into a forward section 154 and an aft section 156. However, the TPS 50 may be divided into any number of sections and is not limited to a forward section 154 and an aft section 156. Furthermore, it is contemplated that the TPS 50 may comprise a single, unitary structure (not shown) extending from the forward end 14 of the vehicle 10 toward the aft end 16 of the vehicle 10.

Referring to FIGS. 3-4, shown are perspective views of an underside of the vehicle 10 and the TPS 50. As can be seen, the forward and aft sections 154, 156 of the lower portion 150 of the TPS 50 may include a cutout 52 for accommodating the vehicle 10 propulsion system (not shown). Referring to FIGS. 2 and 4, the upper portion 148 of the TPS 50 may include one or more apertures 54 formed in an aft end 68 of the TPS 50 for accommodating a shaft (not shown) on which control surfaces 42 (FIG. 1) may be mounted.

Referring to FIGS. 1-4, at a forward end 14 of the vehicle 10, the TPS 50 may optionally include a closeout assembly 28 for thermally shielding the connection of the nose piece 26 to the thermal isolator 34 (FIG. 4). In the embodiment shown, the closeout assembly 28 may comprise one or more closeout portions 30. Each one of the closeout portions 30 may optionally be formed of materials similar to the TPS 50 of the upper and lower portions 148, 150 as described in great detail below. The closeout portions 30 may be assembled to the thermal isolator 34 by means one or more closeout brackets 32 by using a plurality of mechanical fasteners 100 (not shown). The closeout portions 30 may also provide a shield for the attachment of an aeroshell 80 (FIG. 14) to the substructure 12 as is also described in greater detail below.

Figure 5:
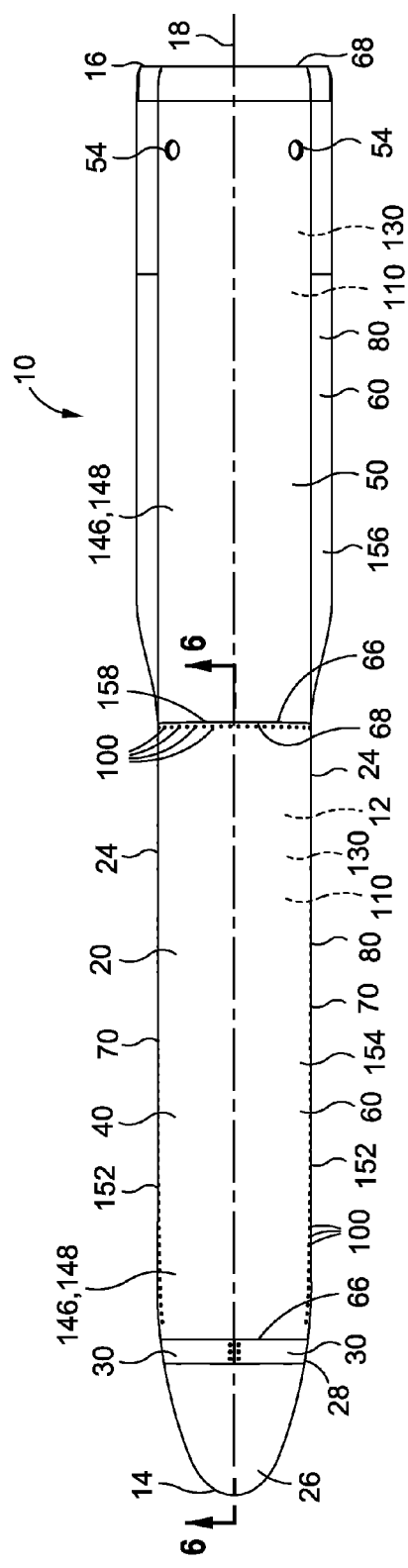
FIG. 5 is a top view of the hypersonic vehicle illustrating the TPS divided into a forward section and an aft section.

Referring to FIG. 5, shown is a top view of the vehicle 10 having the TPS 50 installed and illustrating the installation of the closeout portions 30 to the vehicle 10 at the forward end 66 of the TPS 50. Also shown are the forward and aft sections 154, 156 of the upper portion 148 joined to one another along a transverse joint 158. As described in greater detail below, the transverse joint 158 may include a plurality of mechanical fasteners 100 for joining the forward section 154 to the aft section 156. The mechanical fasteners 100 may be threadably engaged to a corresponding quantity of receptacles such as nut plates (not shown) or other suitable receptacles for interconnecting the forward section 154 to the aft section 156.

Figure 6:
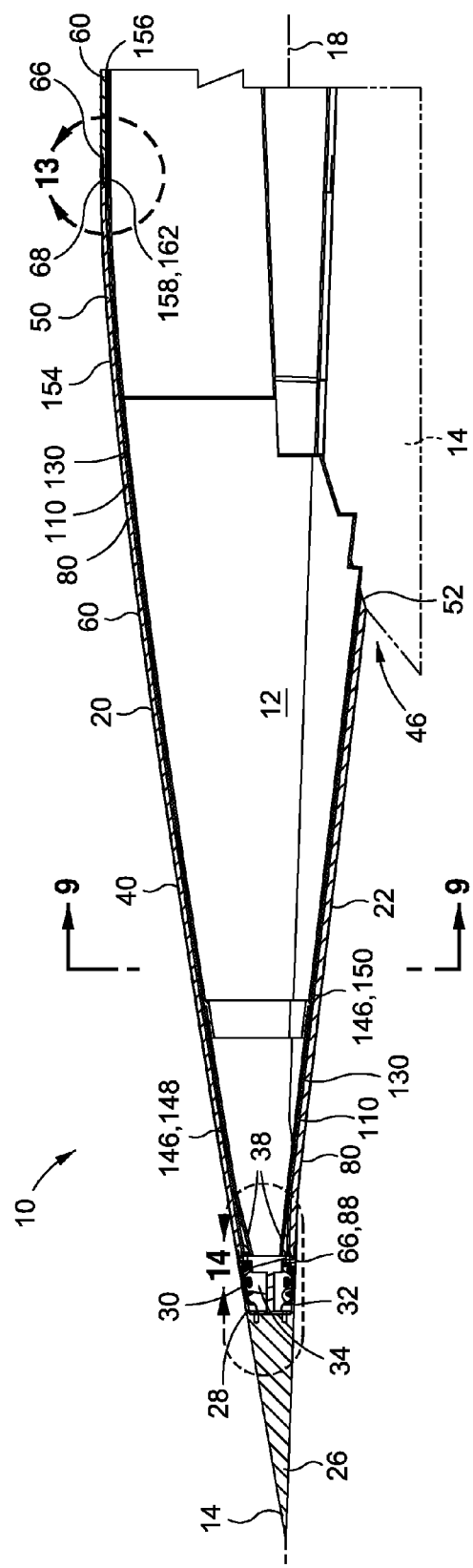
FIG. 6 is a sectional view of the hypersonic vehicle taken along line 6 of FIG. 5 and illustrating the attachment of the upper and lower portions of the TPS to the substructure.

Referring to FIG. 6, shown is a sectional view of the vehicle 10 illustrating the upper and lower portions 148, 150 of the TPS 50 mated together and installed on the substructure 12. The substructure 12 may have a generally wedge shaped section 40 and/or conically shaped section extending at least along a portion of a length of the vehicle 10. For example, FIG. 6 illustrates the forward end 66 of the upper and lower portions 148, 150 of the TPS 50 having a wedge shape which may be formed complementary to the generally wedge shaped section 40 of the substructure 12. The aft section 156 of the TPS 50 may be formed complementary to the shape of the substructure 12 which may have a reduced tapered shape or a non-tapered shape. However, as was indicated above, the vehicle 10 may be provided in any size, shape, and configuration and is not limited to a generally wedge shaped section 40 or conically shaped section at a forward end 14 of the vehicle 10 and a generally non-tapered shape aft of the wedge shaped section 40.

Referring still to FIG. 6, the upper and lower portions 148, 150 of the TPS 50 may each be formed as shell assemblies 60. Each shell assembly 60 may be comprised of a substantially rigid aeroshell 80, a substantially rigid or generally non-elastic, relatively low density insulation layer 110, and a resiliently compressible conformal layer 130. Each shell assembly 60 may be sized and configured complementary to the substructure 12. For example, the shell assembly 60 of the upper portion 148 and the shell assembly 60 of the lower portion 150 may each be formed complementary to the shape or configuration of the substructure 12.

Advantageously, the aeroshell 80 is configured to be fastened to the substructure 12 in a manner causing the conformal layer 130 to be compressively preloaded against the substructure 12. The compressive preloading of the conformal layer 130 may result in the insulation layer 110 being maintained primarily in a compressive loading condition during movement of the TPS 50 relative to the substructure 12. In addition, the conformal layer 130 may be formed of material having relatively low shear stiffness and/or relatively low tension stiffness such that the conformal layer 130 mechanically isolates the relatively rigid and non-elastic insulation layer 110 from excessive mechanical strain during movement of the TPS 50 relative to the substructure 12. In this manner, the conformal layer 130 may limit the loading of the insulation layer 110 to a primarily compressive loading and thereby minimize additional weight associated with an insulation layer 110 having shear-loading or tension-loading capability. As indicated above, movement of the TPS 50 relative to the substructure 12 may occur in response to dynamic flight loads exerted on the vehicle 10 during vehicle maneuvering, during vehicle launch, during ground handling, or in response to other loads that may be placed on the vehicle 10. In addition, movement of the TPS 50 relative to the substructure 12 may occur in response to thermal loads applied to the vehicle 10 due to differential heating of the TPS 50 and substructure 12 and/or due to mismatch of a coefficient of thermal expansion (CTE) of the TPS 50 material relative to the CTE of the substructure 12 material(s) as described in greater detail below.

Advantageously, the compressive preloading of the conformal layer 130 may additionally result in a substantially continuous (i.e., over time) and/or uniform circumferential tension load or hoop load in the aeroshell 80 which may improve the structural stability of the TPS 50. In this regard, by loading the aeroshell 80 in circumferential tension or hoop tension due to compressive preloading of the conformal layer 130, the aeroshell 80 and the insulation layer 110 may effectively be pressurized in a radially outward direction which may improve the stiffness of the aeroshell 80 and the insulation layer 110. The improved stiffness of the aeroshell 80 and the insulation layer 110 may minimize buckling deformation of the aeroshell 80 and insulation layer 110. In a further advantage provided by the TPS 50 as disclosed herein, the attachment of the aeroshell 80 to the vehicle 10 is preferably, but optionally, limited to a single location such as attachment of a forward end 66 of the aeroshell 80 to a forward end 14 of the substructure 12 to minimize or limit direct thermal conduction of heat into the substructure 12. In this regard, the TPS 50 arrangement disclosed herein minimizes internal structural connection between the outer aeroshell 80 and the underlying substructure 12 as described in greater detail below.

Referring to FIG. 7, shown is an exploded sectional view of the TPS 50 (FIG. 1) and substructure 12. In an embodiment, the TPS 50 may optionally be formed as one or more mating portions 146 (FIG. 1) such as the upper and lower portions 148, 150 illustrated in FIG. 7. However, the TPS 50 may be formed as a plurality of mating portions such as an opposing pair of side portions (not shown) which may be joined along an upper longitudinal joint (not shown) and a lower longitudinal joint (not shown). Even further, the TPS 50 may be configured as three or more mating portions 146 which may be joined to one another along a corresponding quantity of longitudinal joints. Any one of the mating portions 146 may be further subdivided into two (2) or more sections such as forward and aft sections 154, 156 (FIG. 4) of the TPS 50 embodiment disclosed herein. However, the TPS 50 may be formed as a unitary structure (not shown) comprising the aeroshell 80, the insulation layer 110, and the conformal layer 130 as indicated above.

FIG. 7 illustrates an exploded view of the shell assembly 60 of the upper portion 148 and the shell assembly 60 of the lower portion 150 which may each be comprised of the aeroshell 80, the insulation layer 110, and the conformal layer 130. The insulation layer 110 may be disposed against the aeroshell 80 such that the insulation layer 110 outer surface 114 is disposed in substantially contacting relation to the aeroshell 80 inner surface 82. Likewise, the conformal layer 130 may be disposable against the insulation layer 110 such that the conformal layer outer surface 134 is in substantially contacting relation with the insulation layer 110 inner surface 112. The aeroshell 80, insulation layer 110, and/or the conformal layer 130 of each shell assembly 60 are preferably formed complementary to the substructure 12. The shell assembly 60 of the upper portion 148 may be formed complementary to the crown 20 and the opposing sides 24 of the substructure 12. Likewise, the shell assembly 60 of the lower portion 150 may be formed complementary to the belly 22 and the sides 24 of the substructure 12.

Referring to FIG. 8, shown is the shell assembly 60 of the upper portion 148 in an assembled state and the shell assembly 60 of the lower portion 150 in an assembled state. In an embodiment, the insulation layer 110 may be adhesively bonded to the aeroshell 80 such that the insulation layer 110 outer surface 114 (FIG. 7) is bonded to the aeroshell 80 inner surface 82 (FIG. 7). Likewise, the conformal layer 130 may be bonded to the insulation layer 110 such that the conformal layer 130 outer surface 134 (FIG. 7) is adhesively bonded to the insulation layer 110 inner surface 112 (FIG. 7). The aeroshell 80 of the upper portion 148 may include an opposing pair of side edges 70. Similarly, the aeroshell 80 of the lower portion 150 may include an opposing pair of side edges 70 which may be formed complementary to the side edges 70 of the upper portion 148 to facilitate mating of the upper portion 148 to the lower portion 150.

Referring to FIG. 9, shown is the upper portion 148 and lower portion 150 installed on the substructure 12 and mated to one another along the pair of longitudinal joints 152 located on opposing sides 24 of the vehicle 10. The conformal layer 130 is shown in a compressed state wherein the mating of the upper portion 148 to the lower portion 150 results in the compressive preloading of the conformal layer 130 between the insulation layer 110 and the substructure 12. Advantageously, the conformal layer 130 is formed of resiliently compressible material such that once the TPS 50 is installed onto the substructure 12, the conformal layer 130 is maintained in a compressed state. In addition, the aeroshell 80 and insulation layer 110 may be loaded in circumferential tension or hoop load to improve the buckling stability of the TPS 50 under load. In addition, the compressive preloading on the conformal layer 130 preferably results in a substantially uniform distribution of pressure at the interface of the insulation layer 110 to the conformal layer 130. In this regard, the conformal layer 130 may minimize or eliminate localized stress concentrations in the insulation layer 110 which, if excessive, may compromise the structural integrity and the insulative capability of the insulation layer 110. In an embodiment, the insulation layer 110 may be formed of relatively rigid material such as relatively low density fibrous ceramic material for thermally isolating the substructure 12 from the relatively high temperature aeroshell 80. In this regard, the insulation layer 110 preferably has a relatively low thermal conductivity and relatively high specific heat in order to reduce or minimize heat flux that may be otherwise transferred into the substructure 12.

Figure 10:
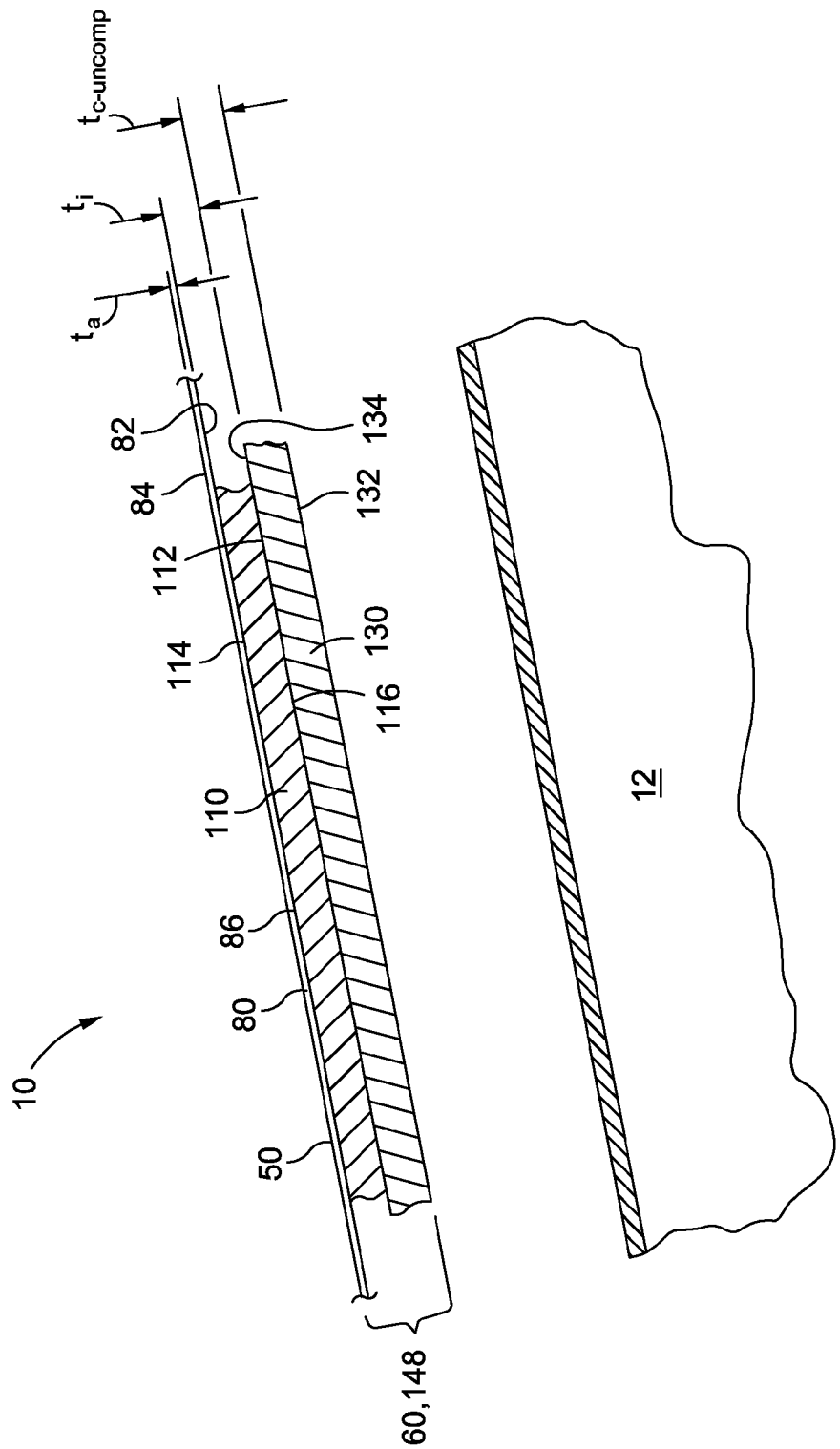
FIG. 10 is a partially exploded longitudinal sectional view of the hypersonic vehicle taken along line 10 of FIG. 8 and illustrating the shell assembly of the upper portion comprising the aeroshell, insulation layer, and conformal layer and wherein the conformal layer has an uncompressed thickness.

Referring to FIG. 10, shown is a sectional view of the upper portion 148 shell assembly 60 prior to installation on the substructure 12. The insulation layer 110 (FIG. 9) may be bonded to the aeroshell 80 by an adhesive layer 86. Likewise, the conformal layer 130 may be bonded to the insulation layer 110 by an adhesive layer 116 as indicated above. The conformal layer 130 is shown in an uncompressed state having an uncompressed thickness $t_{c\text{-}uncomp}$ prior to installation of the shell assembly 60 onto the substructure 12.

Figure 11:
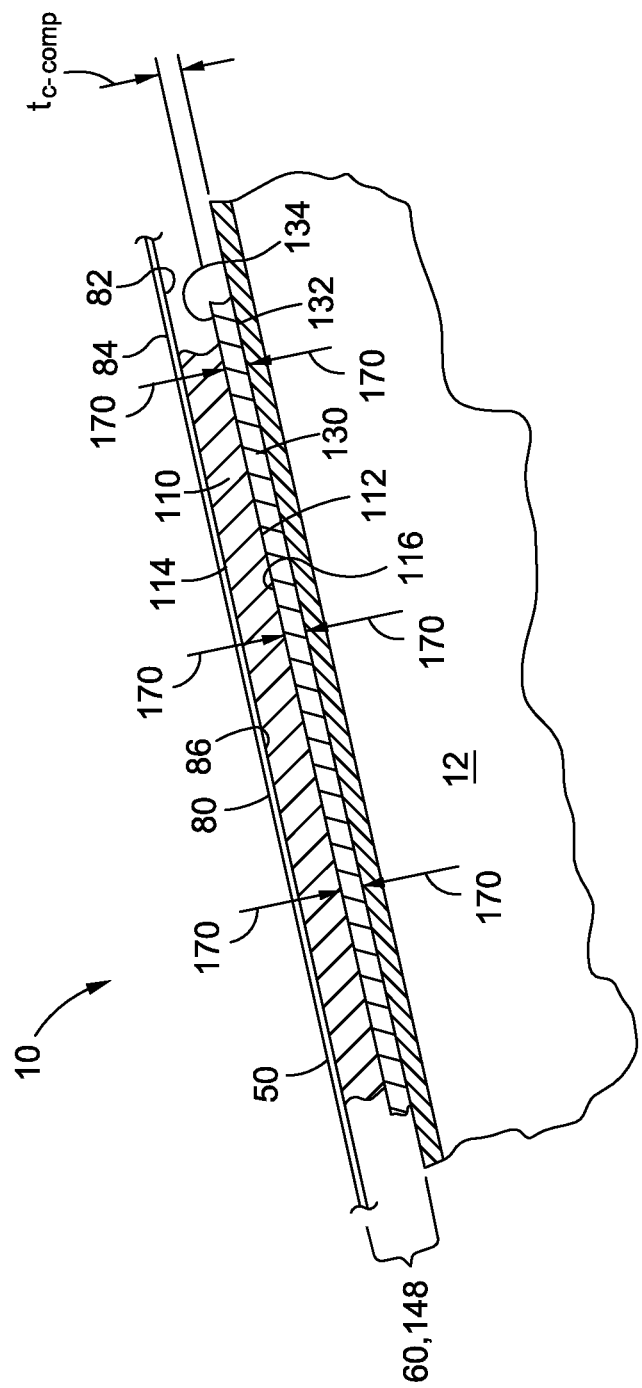
FIG. 11 is a longitudinal sectional view of the hypersonic vehicle taken along line 11 of FIG. 9 and illustrating the shell assembly of the upper portion installed on the substructure such that the conformal layer is compressively preloaded to a compressed thickness.

Referring to FIG. 11, shown is the installation of the shell assembly 60 onto the substructure 12 and the compressive preload 170 of the conformal layer 130 resulting in the comp conformal layer 130 having a compressed thickness $t_{c\text{-}comp}$ that is less than the uncompressed thickness $t_{c\text{-}uncomp}$ of the conformal layer 130 illustrated in FIG. 10. Although not shown, the mounting of the lower portion 150 to the substructure 12 also results in the compressive preload of the conformal layer 130 similar to that which is illustrated for the upper portion 148 in FIG. 11. In this regard, the TPS 50 is preferably sized and configured such that the compressive preload 170 of the conformal layer 130 is uniformly distributed along a substantial portion of the length of the insulation layer 110 and around a substantial portion of the circumference (not shown) of the insulation layer 110. In the embodiment illustrated in FIGS. 10 and 11, the conformal layer 130 may be disposed in contacting relation to the substructure 12 in an unbonded state such that the upper portion 148 and the lower portion 150 of the TPS 50 may be removed from the vehicle 10 by removal of the mechanical fasteners 100 from forward end 66 (FIG. 6) of the aeroshell 80 as described below.

Figure 12:
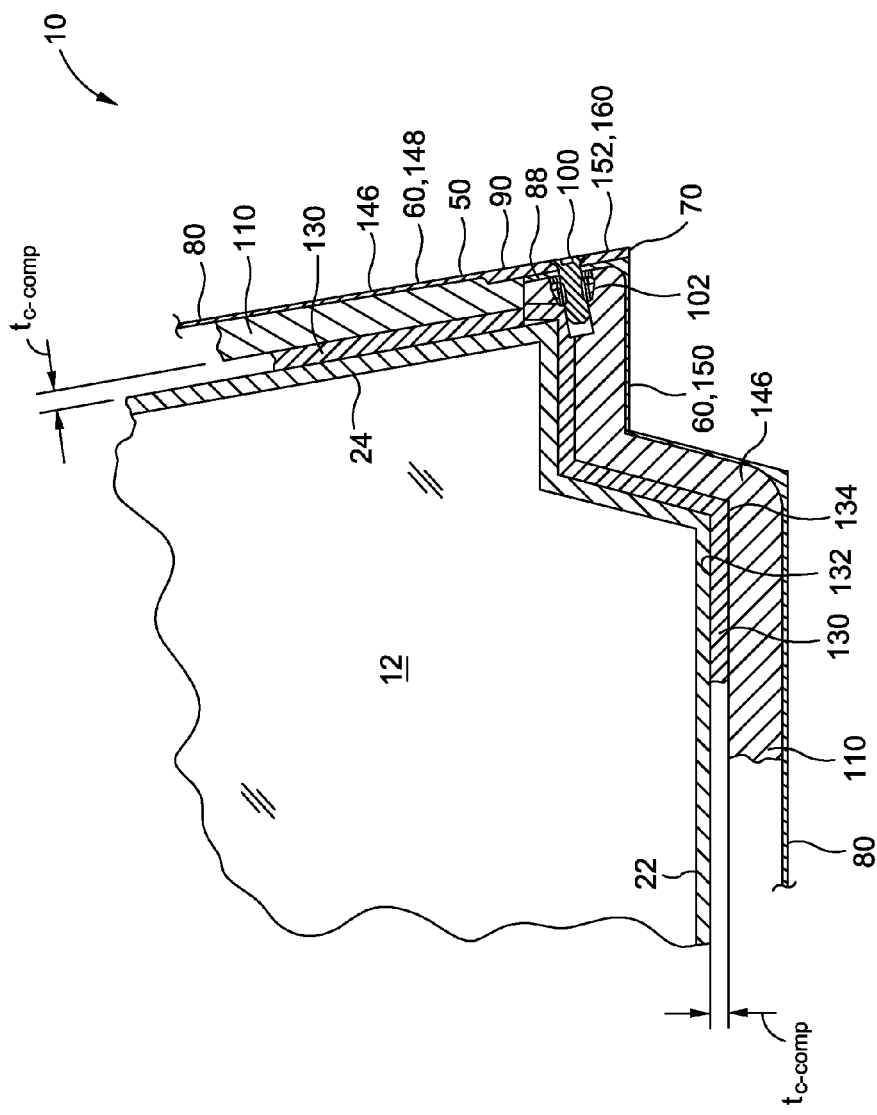
FIG. 12 is a longitudinal sectional view of the hypersonic vehicle taken along line 12 of FIG. 9 and illustrating a longitudinal joint of the shell assemblies of the upper portion and the lower portion of the TPS.

Referring to FIG. 12, shown is a partial sectional view of a longitudinal joint 152 for mating the upper portion 148 to the lower portion 150. The aeroshell 80 of the upper portion 148 may include a locally thickened area 90 for improving bearing stress capability of the aeroshell 80 along the side edge 70. Likewise, the aeroshell 80 of the lower portion 150 may include a locally thickened area 90 in order to transfer loads (e.g., hoop loads) across the longitudinal joint 152 between the upper and lower portions 148, 150. In the embodiment shown, the upper portion 148 may be joined to the lower portion 150 by means of one or more fasteners 100 extending through the aeroshell 80 and into a threaded receptacle such as a nut plate or any other suitable engagement mechanism for engaging the fastener 100. Although shown as a lap joint, the longitudinal joint 152 may be provided in a variety of joint configurations, including, but not limited to, a tongue and groove arrangement or in other suitable joint arrangements.

The insulation layer 110 of the upper portion 148 is preferably configured to mate with or abut against the insulation layer 110 of the lower portion 150 to provide thermal sealing along the longitudinal joint 152. Likewise, the conformal layers 130 of the upper portion 148 and the lower portion 150 are preferably configured to abut against one another to provide thermal sealing along the longitudinal joint 152. The inner surfaces 132 of the conformal layer 130 of the lower portion 150 along the side edges 70 may also be vertically oriented to facilitate installation and removal of the lower portion 150 from the substructure 12. FIG. 12 illustrates the compressive preloading of the conformal layer 130 of the upper portion 148 and the lower portion 150 wherein the conformal layer 130 is compressed to a compressed thickness $t_{c\text{-}comp}$.

Figure 13:
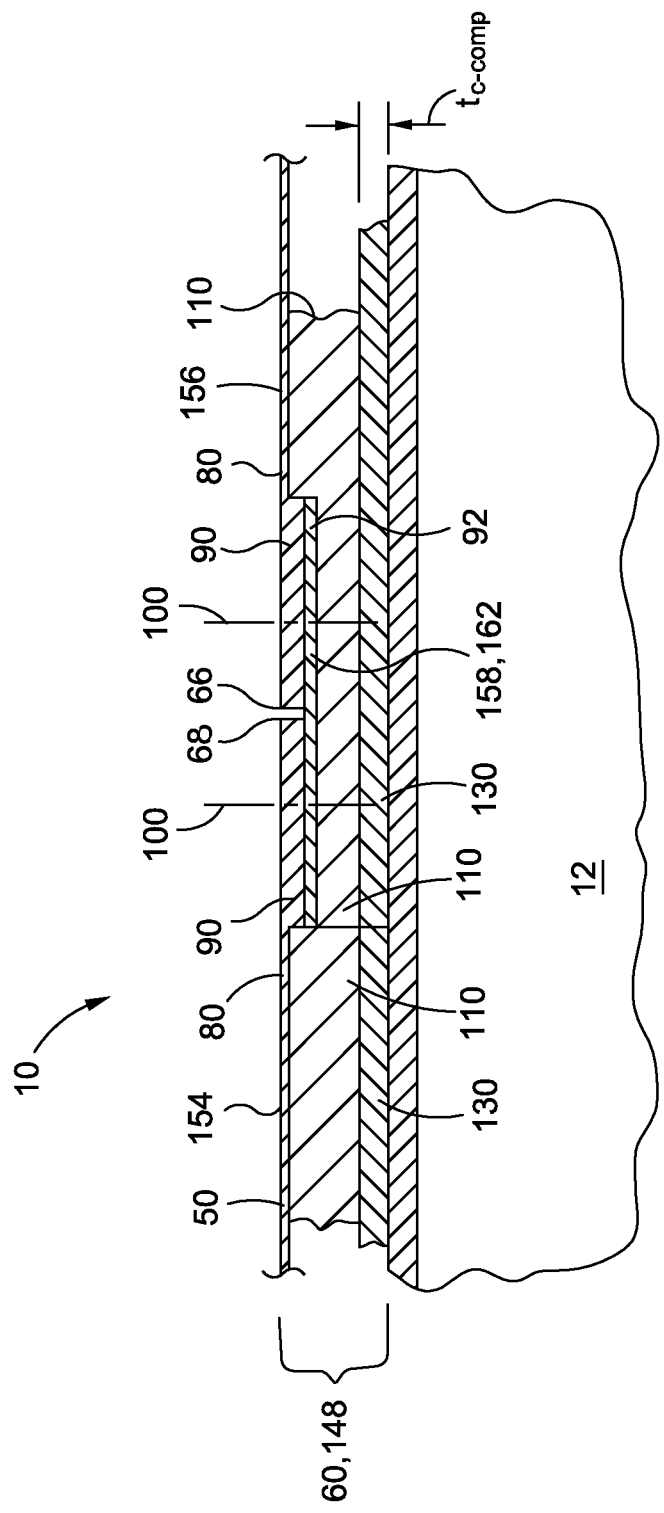
FIG. 13 is a transverse sectional view of the hypersonic vehicle taken along line 13 of FIG. 6 and illustrating a transverse joint joining a forward section and an aft section of the upper portion of the TPS.

Referring to FIG. 13, shown is a section view of an embodiment of a transverse joint 158 for joining the forward section 154 to the aft section 156. At least a portion of the transverse joint 158 may be oriented generally perpendicularly relative to the longitudinal axis 18 (FIG. 6). The aft end 68 of the aeroshell 80 of the forward section 154 may include a locally thickened area 90 for accommodating additional bearing stresses that may occur in the aeroshell 80 around the fasteners 100. Likewise, the forward end 66 of the aeroshell 80 of the aft section 156 may include a locally thickened area 90 for accommodating bearing stresses in the aeroshell 80 around the fasteners 100. The transverse joint 158 is shown in a butt joint 162 configuration wherein the aft end 68 of the aeroshell 80 of the forward section 154 may be generally butted up against or disposed in slightly gapped relation to the forward end 66 of the aeroshell 80 of the aft section 156. The aeroshell 80 of the forward and aft sections 154, 156 may be interconnected to one another by means of a splice plate 92. The splice plate 92 may be formed of a compatible material such as a ceramic matrix composite material similar to the ceramic matrix composite material of the aeroshells 80. The gap between the forward and aft ends 66, 68 of the aeroshell 80 is preferably minimized to minimize aerodynamic pressure losses in the air flow (not shown) passing over the transverse joint 158. Although not shown in FIG. 13, mechanical fasteners may be threadably engaged to nut plates or other suitable receptacles to positively attach the forward section 154 of the TPS 50 to the aft section 156 of the TPS 50 via the splice plate 92. It should be noted that although FIG. 13 illustrates the transverse joint 158 in a butt joint 162 configuration, the transverse joint 158 may be configured in a lap joint 160 configuration or in other joint configurations.

Figure 14:
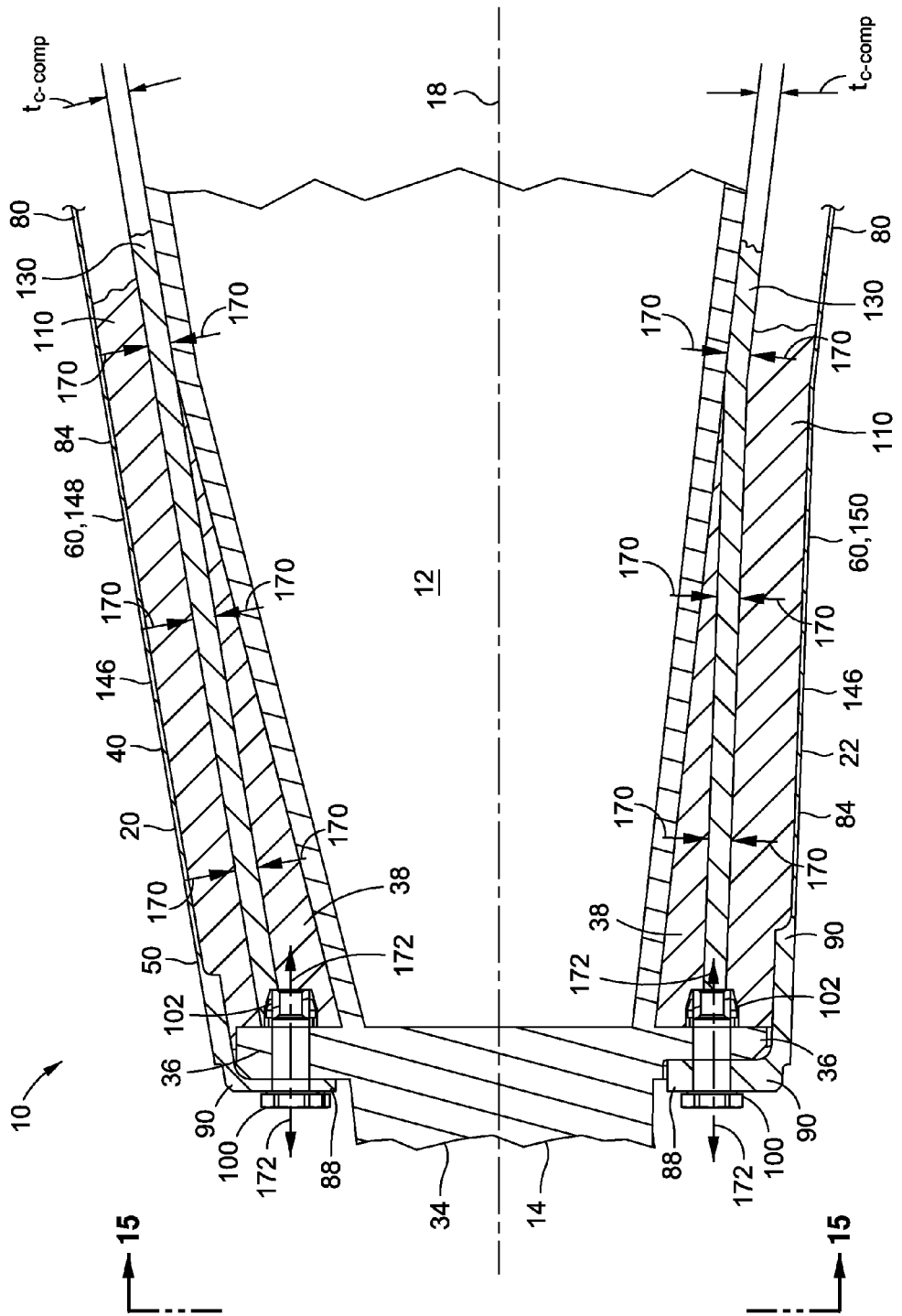
FIG. 14 is a longitudinal sectional view of the hypersonic vehicle taken along line 14 of FIG. 6 and illustrating the fastening of a forward end of the aeroshell of the upper and lower portions to the substructure.

FIG. 14 is a sectional illustration of a portion of the vehicle 10 at a forward end 14 thereof and illustrating the attachment of the aeroshell 80 to the substructure 12. In the embodiment shown, the aeroshell 80 of the upper portion 148 and the aeroshell 80 of the lower portion 150 each include a flange 88 which extends generally radially inwardly. The aeroshell 80 flanges 88 may be generally locally thickened 90 relative to the thickness $t_a$ of the aeroshell 80 along the exposed aeroshell 80 outer surface 84. The flanges 88 may be engaged to flanges 36 of the substructure 12 and may be fastened thereto to provide single fixity mechanical attachment of the TPS 50 to the substructure 12. The fasteners 100 may preferably be formed of relatively high temperature material having relatively low thermal conductivity and may be threadably engaged to nut plates 102 or suitable threaded receptacles which may be disposed against or mounted to a backside of the flange 36 of the substructure 12. The substructure 12 flanges 36 may extend radially outwardly from the thermal isolator 34 portion of the substructure 12.

As was indicated earlier, the shell assembly 60 of the upper portion 148 and the lower portion 150 are preferably sized and configured such that when the shell assemblies 60 are installed on the substructure 12, the conformal layer 130 is compressively preloaded 170. Due to the generally wedge-shaped and/or conical configuration of at least a section 40 of the substructure 12, by orienting the fasteners 100 generally parallel to the longitudinal axis 18 of the vehicle 10, the fasteners 100 attaching the aeroshell 80 to the substructure 12 may be loaded in tension 172 when the upper and lower portions 148, 150 are installed on the substructure 12 and the conformal layer 130 is compressively preloaded 170. A filler 38 material may be installed on an aft side of the substructure 12 flange 36 between the conformal layer 130 and the substructure 12. The filler 38 material may comprise a graphite/epoxy laminate or structurally and/or thermally substantially equivalent material to minimize heat flux into the substructure 12.

It should be noted that the fastening of the aeroshell 80 to the substructure 12 is not limited to fastening the aeroshell 80 to the forward end 14 of the substructure 12 as illustrated in FIG. 14 but may include alternative arrangements. In this regard, the aeroshell 80 may be fastened to the substructure 12 at any location along a length of the substructure 12 that would result in compressive preloading of the conformal layer 130. For example, the aeroshell 80 may be configured to be mechanically fastened to the vehicle 10 at either one of the opposing ends of the aeroshell 80. In an embodiment (not shown), the aeroshell 80 of the forward section 154 of the upper portion 148 may be fastened to the substructure 12 at an aft end 68 of the forward section 154. In this regard, the mechanical fastening of the aeroshell 80 to the substructure 12 may be positioned at any location that provides a hard point for attachment of the aeroshell 80 and wherein conduction of heat directly into the substructure 12 is minimized. For example, the aeroshell 80 may be fastened to the substructure 12 at a temperature benign location that is subjected to low heat loads relative to other locations of the vehicle 10. Preferably, mechanical fastening of the aeroshell 80 to the substructure 12 is limited to a single location along the length of the vehicle 10 such that the remaining portion of the aeroshell does not contact the substructure 12. In addition, the aeroshell is preferably fastened to the substructure 12 using a minimal quantity of fasteners 100 to minimize the quantity of heat conduction paths into the substructure 12 and to minimize part count.

Figure 15:
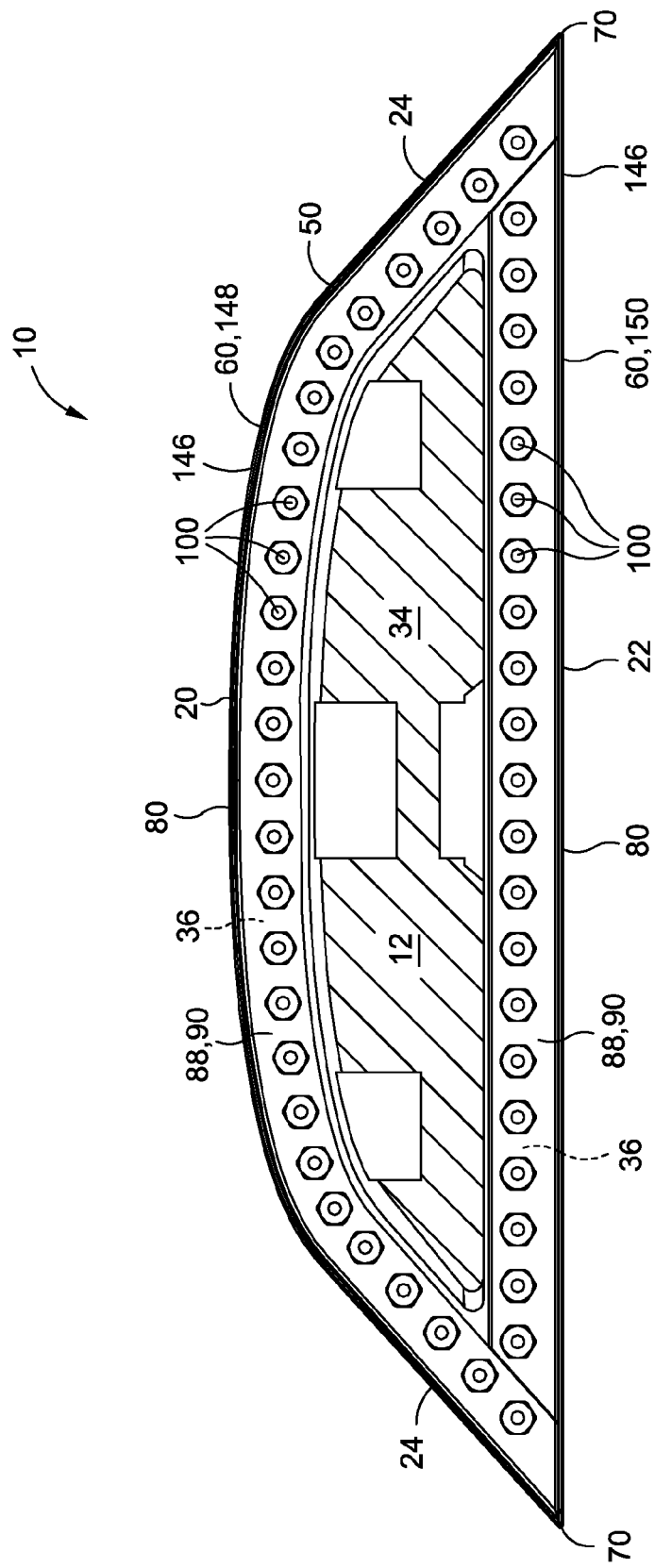
FIG. 15 is an aft view of the hypersonic vehicle taken along line 15 of FIG. 14 and illustrating an arrangement of mechanical fasteners fastening the aeroshells of the upper and lower portions of the TPS to the substructure.

Referring to FIG. 15, shown is an aft view of the vehicle 10 at the location of the attachment of the aeroshells 80 to the substructure 12. A plurality of mechanical fasteners 100 are shown extending through the flanges 88 of the aeroshells 80. The flange 88 of the upper portion 148 may at least partially overlap a portion of the flange 88 of the lower portion 150. The closeout assembly 28 illustrated in FIGS. 3 and 4 thermally shield the mechanical fasteners 100 from direct exposure to the hot convective flow passing over the TPS 50 during flight of the vehicle 10.

Advantageously, the aeroshell 80 attachment to the substructure 12 may result in a predetermined amount of compressive preloading of the conformal layer 130 (FIG. 14). The magnitude of the compressive preload 170 (FIG. 11) may be selected based upon mission requirements such as the mechanical loads that may be imposed on the vehicle 10 for a given mission. For example, as indicated above, the mechanical loads may include flight loads, launch loads, ground handling loads, and other loads. In addition, the magnitude of compressive preload 170 may be selected based upon thermal loads to which the vehicle 10 may be subjected. For example, the magnitude of compressive preload 170 may be based upon the predicted thermal mismatch that may occur between the aeroshell 80, insulation layer 110 (FIG. 11), and the substructure 12 as a result of differential coefficients of thermal expansion (CTE) of the aeroshell 80 and insulation layer 110 relative to the substructure 12. In an embodiment, the conformal layer 130 may be compressively preloaded by an amount that minimizes or limits the movement of the aeroshell 80 and insulation layer 110 relative to the substructure 12 and provides a desired degree of circumferential tension load (i.e., hoop stress) in the aeroshell 80 to increase resistance of the aeroshell 80 to buckling under load. In this manner, bending stresses in the aeroshell 80 and insulation layer 110 may be maintained below the allowable stress of the aeroshell 80 and insulation layer 110 materials.

Referring generally to FIG. 11, the conformal layer 130 is preferably formed of a material having relatively low shear stiffness and/or relatively low tension stiffness such that the conformal layer 130 may mechanically isolate the relatively rigid and non-elastic insulation layer 110 from excessive mechanical strain. Such mechanical strain may otherwise occur in the insulation layer 110 due to mismatch in the CTE of the substructure 12 relative to the CTE of the insulation layer 110 or aeroshell 80 to which the insulation layer 110 may be bonded. The conformal layer 130 may also minimize or prevent excessive mechanical strain in the insulation layer 110 as a result of static and/or dynamic loads on the vehicle 10 such as aerodynamic pressure loads, ground handling loads, vibration loads and other loads. In this regard, the relatively low shear stiffness or tensile stiffness of the conformal layer 130 allows the conformal layer 130 to resiliently stretch and deform along a shear or tensile direction of the conformal layer 130 such that the insulation layer 110 is mechanically isolated from such shear and tension loads and is instead primarily loaded in compression. By limiting the insulation layer 110 to primarily compressive loads, the insulation layer 110 may survive differential thermal expansion due to mismatch in the CTE of the TPS 50 and the substructure 12 and also survive vibration loads and bending loads on the vehicle 10.

Material from which the conformal layer 130 may be formed includes, but is not limited to, room temperature vulcanizing (RTV) adhesive, silicone foam, felt such as carbon felt, aramid polymeric felt (e.g., Nomex™ felt), ceramic fibrous felt (e.g., K-Shield™ felt), ceramic felt such as alumina felt, and zirconia felt. The conformal layer 130 may also be formed of opacified fibrous insulation, and sprayable nano-foam. As was indicated earlier, the conformal layer 130 may be disposable against the inner surface 112 of the insulation layer 110. For example, the conformal layer 130 outer surface 134 may be adhesively bonded to the insulation layer 110 inner surface 112 using a suitable adhesive. The adhesive for bonding the conformal layer 130 to the insulation layer 110 may include a relatively high temperature silicone adhesive suitable for relatively low to intermediate temperature applications, a ceramic cement for relatively higher temperature applications, or any one of a variety of other temperature-suitable adhesives for bonding the conformal layer 130 to the insulation layer 110.

It should be noted that the TPS 50 is not limited to an arrangement wherein the conformal layer 130 is adhesively bonded to the insulation layer 110. For example, it is contemplated that the conformal layer 130 may be bonded to the substructure 12. Even further, the conformal layer 130 may be installed using a combination of bonding portions of the conformal layer 130 to portions of the substructure 12 and bonding remaining portions of the conformal layer 130 to other portions of the insulation layer 110. Even further, it is contemplated that the conformal layer 130 may be non-adhesively installed or the conformal layer 130 may be installed using a mechanical attachment arrangement (not shown) or any combination of bonding and mechanical attachment. The conformal layer 130 may also be disposed on the vehicle 10 without mechanical connection or adhesive connection to either the insulation layer 110 or the substructure 12. In an embodiment, the conformal layer 130 may be provided with an uncompressed thickness $t_{c\text{-}uncomp}$ (FIG. 10) in the range of from approximately between 0.12 inch to approximately 1.0 inch. However, the conformal layer 130 may be provided in any thickness $t_{c\text{-}uncomp}$.

Referring to FIG. 11, the insulation layer 110 may be formed of a relatively low density, high temperature resistant, substantially rigid or non-elastic material such as ceramic and/or carbon foam for minimizing heat flux from the outer aeroshell 80 to the underlying substructure 12. In an embodiment, the insulation layer 110 may comprise a fibrous ceramic material. For example, the insulation layer 110 may be formed of rigid fibrous silica insulation which may optionally include aerogel infiltration, rigid fibrous alumino silicate insulation, which may also optionally include aerogel infiltration, a foam material such as carbon foam and ceramic foam, either of which may optionally include aerogel infiltration, silicon carbide foam which may also optionally include aerogel infiltration. The insulation layer 110 may additionally be formed of carbon foam with phase change material such as lithium fluoride or silicon carbide foam with phase change material such as lithium fluoride. Although lithium fluoride is indicated as a phase change material for use with the carbon foam or silicon carbide foam, other phase change materials may be used. It should be noted that the insulation layer 110 may be formed of other suitable relatively low density, substantially rigid insulating materials and is not limited to the material listed above.

The insulation layer 110 may be provided in a thickness $t_i$ (FIG. 10) based upon the expected heating environment. In an embodiment, the insulation layer 110 may be provided in a thickness t, in a range from approximately 0.25 to 5.0 inch, although the insulation layer 110 may be provided in any thickness t, above or below the 0.25 to 5.0 inch range. The insulation layer 110 may be bonded or co-cured to the aeroshell 80. For example, the insulation layer 110 may be bonded to the aeroshell 80 with a suitable ceramic adhesive. The composition of the ceramic adhesive may be dictated by the heating environment and the mismatch in CTE of the insulation layer 110 relative to the aeroshell 80.

Referring still to FIG. 11 the aeroshell 80 may be provided as a substantially rigid and relatively thin member preferably having relatively high temperature resistance and relatively high structural durability. In a non-limiting embodiment, the aeroshell 80 may be formed of a ceramic matrix composite material. The aeroshell 80 material may have a relatively high modulus of elasticity (i.e., high stiffness) and relatively high strength and durability such that the aeroshell 80 may resist damage as a result of environmental and/or operational impacts. Environmental impacts may include impacts from rain, hail, and other objects during flight. Operational impacts may include impacts from dropped tools or other impacts that may occur during assembly, maintenance, repair, and ground handling. The aeroshell 80 preferably has a reduced cross-sectional thickness $t_a$ (FIG. 10) in order to minimize weight and to facilitate a degree of bending or flex in the aeroshell 80 under load.

The aeroshell 80 material may also have a relatively high emissivity and relatively low catalycity to promote distribution of heat along the plane of the aeroshell 80 and minimize heat flux into the insulation layer 110. In this regard, the ceramic matrix composite material may include fibers (not shown) that may be oriented substantially parallel to the plane of the aeroshell 80. The ceramic matrix composite material may be provided with a heat treatment for improving in-plane thermal conductivity in the aeroshell 80 and limiting heat flux into the insulation layer 110. Non-limiting examples of materials from which the aeroshell 80 may be fabricated include, continuous carbon fiber reinforced carbon matrix (C—C), continuous silicon carbide fiber reinforced silicon carbide ceramic matrix composite (SiC/SiC CMC), continuous carbon fiber reinforced silicon carbide ceramic matrix composite (C/SiC CMC), continuous carbon fiber reinforced carbon matrix with silicon carbide outer coating ceramic matrix composite (C—C/SiC CMC), and continuous oxide fiber (e.g., alumina, alumina-silica) reinforced/oxide ceramic matrix composite (e.g., alumina-silica, alumina) (Oxide/Oxide CMC). In a non-limiting embodiment, the aeroshell 80 may be provided in a thickness $t_a$ (FIG. 10) in the range of approximately 0.03 to 0.12 inch although the aeroshell 80 may be provided in thicknesses $t_a$ above and below the 0.03 to 0.12 inch range.

Figure 16:
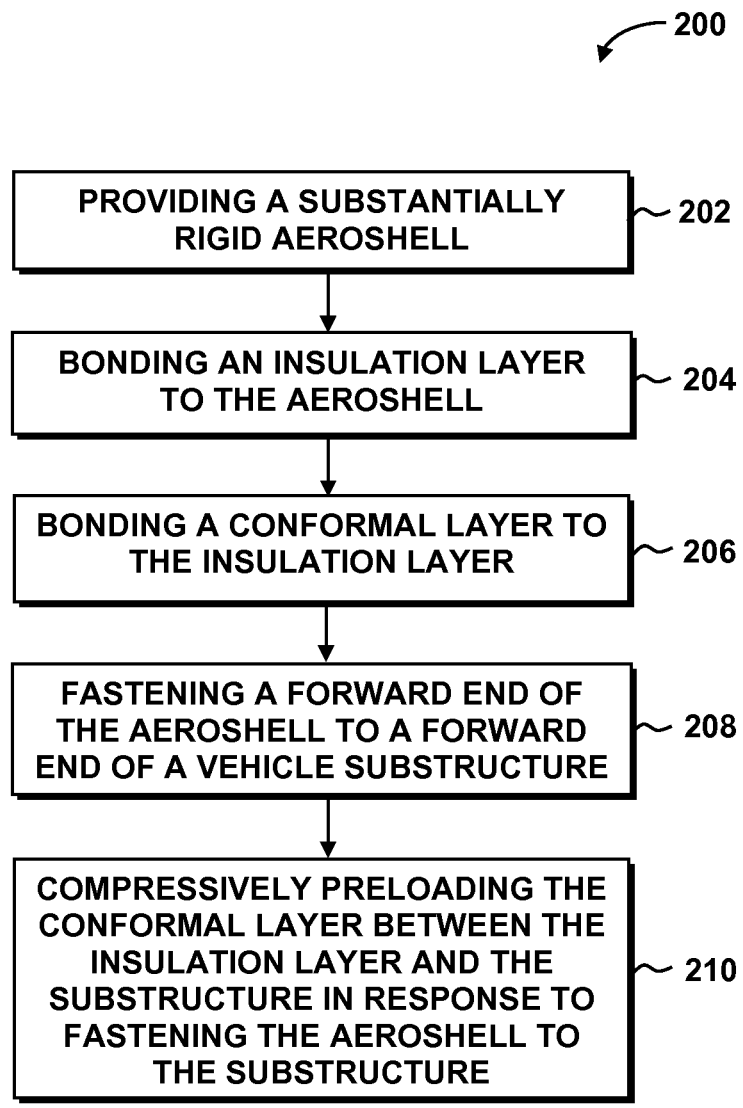
FIG. 16 is a flow chart illustrating one or more operations that may be included in an embodiment of the methodology for thermally insulating a vehicle.

Referring to FIG. 16, shown is a methodology 200 for insulating a vehicle 10 such as a hypersonic vehicle having a substructure 12 (FIG. 7). Step 202 of the methodology may include providing a substantially rigid aeroshell 80 (FIG. 7) having an aeroshell 80 inner surface 82 (FIG. 7). The aeroshell 80 may be formed in a size and shape that is complementary to the size and shape of the vehicle 10. In an embodiment, the aeroshell 80 may be divided into an upper portion 148 (FIG. 7) and a lower portion 150 (FIG. 7) as shown in FIGS. 1-9. However, the aeroshell 80 may optionally be provided as a unitary structure (not shown) or as multiple (e.g., more than two) mating portions (not shown).

Step 204 of the methodology of FIG. 16 may include disposing a relatively low density and substantially rigid insulation layer 110 (FIG. 7) against the inner surface 82 (FIG. 7) of the aeroshell 80. For example, as shown in FIG. 7, the insulation layer 110 outer surface 114 may be adhesively bonded to the aeroshell 80 inner surface 82. The adhesive for bonding the insulation layer 110 to aeroshell 80 is preferably selected based on the expected heating environment of the vehicle 10. In addition, the adhesive for bonding insulation layer 110 to the aeroshell 80 is preferably selected based upon the CTE of the aeroshell 80 relative to the CTE of the insulation layer 110.

Step 206 of the methodology of FIG. 16 may include disposing a resiliently compressible conformal layer 130 (FIG. 7) against the insulation layer 110. In an embodiment, the conformal layer 130 outer surface 134 (FIG. 7) may be adhesively bonded to the insulation layer 110 inner surface 112 (FIG. 7). The adhesive for bonding the conformal layer 130 to the insulation layer 110 may be selected based upon the CTE of the conformal layer 130 and the insulation layer 110.

Step 208 of the methodology of FIG. 16 may include attaching the aeroshell 80 (FIG. 14) to the substructure 12 (FIG. 14). In a non-limiting embodiment, the aeroshell 80 of the upper portion 148 (FIG. 14) and the aeroshell 80 of the lower portion 150 (FIG. 14) may each include the radially inwardly directed flange 88 (FIG. 14) at the forward ends 66 (FIG. 14) thereof and which may be fastened to a radially extending flange 36 (FIG. 14) of the substructure 12 at a forward end 14 of the vehicle 10. One or more mechanical fasteners 100 (FIG. 14) may be extended through the aeroshell 80 flange 88 into the substructure 12 flange 36 such that the conformal layer 130 is compressively preloaded 170 (FIG. 14) in a manner illustrated in FIG. 14. In this regard, the mechanical fasteners 100 may be loaded in tension 172 (FIG. 14) in response to the compressive preloading 170 of the conformal layer 130.

Step 210 of the methodology of FIG. 16 may include compressively preloading the conformal layer 130 (FIG. 14) between the insulation layer 110 (FIG. 14) and the substructure 12 (FIG. 14) in response to attaching the aeroshell 80 to the substructure 12. As was indicated earlier, the compressive preload 170 (FIG. 14) advantageously maintains the aeroshell 80 in hoop tension to improve the structural stability of the aeroshell 80 and the insulation layer 110.

FIG. 14 illustrates the compressive preloading of the conformal layer 130 in response to attaching the aeroshell 80 to the substructure 12 such that the conformal layer 130 has a comp compressed thickness $t_{c\text{-}comp}$ that is less than the uncompressed thickness $t_{c\text{-}uncomp}$ of the conformal layer 130 illustrated in FIG. 10. The compressive preloading of the conformal layer 130 may occur upon installation onto the substructure 12 and may be maintained throughout the operational lifetime of the vehicle 10.

Advantageously, the TPS 50 disclosed herein provides an efficient mechanism for thermal protection of a substructure 12 and for internal systems (not shown) that may be contained within a substructure 12. For example, the disclosed TPS 50 provides improved performance due to the aerodynamic smoothness provided by limiting the quantity of gaps or transverse joints 158 in the aeroshell 80. Furthermore, the relatively thin cross-section of the aeroshell 80 and the relatively low density of the insulation layer 110 results in a TPS 50 having a relatively low mass which may enhance vehicle 10 performance and range. In addition, the TPS 50 disclosed herein may facilitate a reduction in the number of field operations for mission readiness. In this regard, the attachment of the aeroshell 80 to a single location on the substructure 12 and the minimal quantity of mechanical fasteners 100 reduces overall part count which may reduce the amount of time required to remove the TPS 50 for repair and/or access to the underlying substructure 12 and/or the internal systems. The reduced part count may result in a reduction in fabrication cost, installation cost, and maintenance and operations costs. Furthermore, the improved durability of the aeroshell 80 and reduced amount of time to remove, repair and/or replace the TPS 50 may reduce life cycle cost.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A thermal protection system for a vehicle having a substructure, comprising:
   a substantially rigid aeroshell configured to be fastened to the substructure;
   a relatively low density substantially rigid insulation layer disposed against the aeroshell;
   a resiliently compressible conformal layer disposable against the insulation layer and being compressively preloaded against the substructure when the aeroshell is fastened to the substructure;
   the thermal protection system extending around a circumference of the substructure and extending from a forward end to an aft end of the substructure; and
   the aeroshell being mechanically fastened to the substructure at one location along the substructure and enveloping and being non-fastened along a remainder of the substructure in such a manner causing the conformal layer to be compressively preloaded and maintaining the aeroshell in circumferential tension due to the compressive preloading of the conformal layer.

2. The thermal protection system of claim 1 wherein:
the aeroshell is configured to be fastened to the substructure at a location limited to one of opposing ends of the aeroshell.

3. The thermal protection system of claim 1 wherein:
a forward end of the aeroshell is mechanically fastened to a forward end of the substructure.

4. The thermal protection system of claim 1 wherein:
the aeroshell has an inwardly extending flange configured to be fastened to the substructure using at least one mechanical fastener; and
the mechanical fastener being loaded in tension in response to compressive preloading of the conformal layer.

5. The thermal protection system of claim 1 wherein:
the aeroshell, the insulation layer, and the conformal layer collectively comprise a shell assembly; and
the shell assembly being divided into at least two mating portions being joinable to one another along at least one longitudinal joint.

6. The thermal protection system of claim 1 wherein:
the aeroshell, the insulation layer, and the conformal layer collectively comprise a shell assembly; and
the shell assembly being divided into a forward section and an aft section, the forward section being joinable to the aft section along a transverse joint.

7. The thermal protection system of claim 1 wherein:
at least a portion of the substructure is wedge shaped; and
the aeroshell, the insulation layer, and the conformal layer being configured complementary to the substructure.

8. The thermal protection system of claim 1 wherein the insulation layer is adhesively bonded to the aeroshell.

9. The thermal protection system of claim 1 wherein the conformal layer is adhesively bonded to the insulation layer.

10. The thermal protection system of claim 1 wherein the aeroshell is comprised of at least one of the following materials:
   continuous carbon fiber reinforced carbon matrix (C—C);
   continuous silicon carbide fiber reinforced silicon carbide ceramic matrix composite (SiC/SiC CMC);
   continuous carbon fiber reinforced silicon carbide ceramic matrix composite (C/SiC CMC);
   continuous carbon fiber reinforced carbon matrix with silicon carbide outer coating ceramic matrix composite (C—C/SiC CMC); and
   continuous oxide fiber reinforced/oxide ceramic matrix composite (Oxide/Oxide CMC).

11. The thermal protection system of claim 1 wherein the insulation layer is comprised of at least one of the following materials:
   relatively low density, substantially rigid fibrous ceramic material;
   substantially rigid fibrous silica insulation with or without aerogel infiltration;
   substantially rigid fibrous aluminosilicate insulation with or without aerogel infiltration;
   substantially rigid carbon foam with or without aerogel infiltration;
   silicon carbide foam with or without aerogel infiltration;
   carbon foam with phase change material; and
   silicon carbide foam with phase change material.

12. The thermal protection system of claim 1 wherein the conformal layer is comprised of at least one of the following materials:
   room temperature vulcanizing adhesive;
   carbon felt;
   aramid polymeric felt;
   ceramic fibrous felt;
   alumina felt;
   zirconia felt;
   opacified fibrous insulation;
   silicone foam; and
   sprayable nano-foam.

13. A vehicle, comprising:
a substructure; and
a thermal protection system, including:
   a substantially rigid ceramic matrix composite aeroshell configured to be fastened to the substructure;
   a relatively low density substantially rigid ceramic insulation layer disposed against the aeroshell;
   a resiliently compressible conformal layer disposable against the insulation layer and being compressively preloaded against the substructure when the aeroshell is fastened to the substructure;
the thermal protection system extending around a circumference of the substructure and extending from a forward end to an aft end of the substructure; and
the aeroshell being mechanically fastened to the substructure at one location along the substructure and enveloping and being non-fastened along a remainder of the substructure in such a manner causing the conformal layer to be compressively preloaded and maintaining the aeroshell in circumferential tension due to the compressive preloading of the conformal layer.

14. A method of insulating a vehicle having a substructure, comprising the steps of:
providing a substantially rigid aeroshell;
disposing a relatively low density substantially rigid insulation layer against the aeroshell;
disposing a resiliently compressible conformal layer against the insulation layer, the conformal layer having an uncompressed thickness prior to the aeroshell being attached to the substructure;
attaching the aeroshell to the substructure at one location along the substructure, the aeroshell enveloping and being non-fastened along a remainder of the substructure, the thermal protection system extending around a circumference of the substructure and extending from a forward end to an aft end of the substructure; and
compressively preloading the conformal layer between the insulation layer and the substructure in response to attaching the aeroshell to the substructure, the conformal layer having a compressed thickness after the aeroshell is fastened to the substructure, the compressed thickness being less than the uncompressed thickness.

15. The method of claim 14 wherein the step of attaching the aeroshell to the substructure comprises:
fastening one of opposing ends of the aeroshell to the substructure.

16. The method of claim 15 further comprising the step of:
limiting the location of the fastening of the aeroshell to a forward end of the substructure.

17. The method of claim 15 further comprising the steps of:
using at least one mechanical fastener to fasten a forward end of the aeroshell to a forward end of the substructure; and
loading the mechanical fastener in tension in response to compressively preloading the conformal layer.

18. The method of claim 14 further comprising the steps of:
forming a shell assembly comprising at least two mating portions, each one of the mating portions including the aeroshell, the insulation layer, and the conformal layer; and
joining the aeroshells of the mating portions to one another along at least one longitudinal joint.

19. The method of claim 18 further comprising the steps of:
forming the mating portions as an upper portion and a lower portion; and
joining the upper and lower portion to one another along a pair of the longitudinal joints located on opposite sides of the vehicle.

20. The method of claim 14 further comprising the steps of:
forming a shell assembly comprising a forward section and an aft section, each one of the forward and aft sections including the aeroshell, the insulation layer, and the conformal layer;
installing the forward section and the aft section onto the substructure; and
joining the forward section to the aft section along a transverse joint.

* * * * *